3,079,228
PRODUCTION OF ALUMINUM SULFATE
Carl E. Skay, Unionville, N.J., assignor to American Cyanamid Company, New York, N.Y., a corporation of Maine
Filed Jan. 12, 1960, Ser. No. 2,047
2 Claims. (Cl. 23—123)

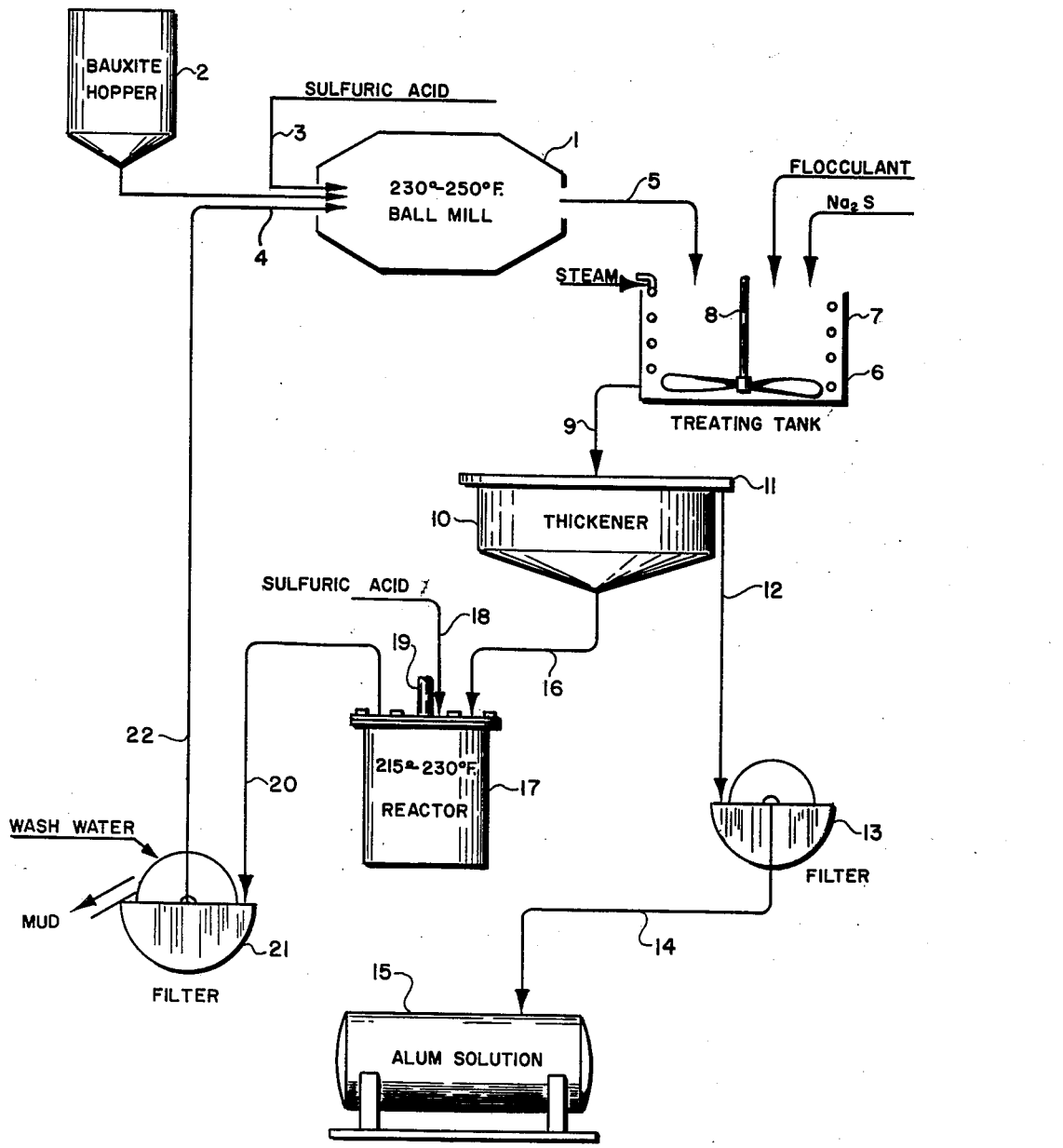

This invention relates to the production of aluminum sulfate by digesting bauxite or other aluminum oxide-containing ores with sulfuric acid. The principal objects of the invention are to shorten the digestion time, to obtain increased extraction efficiency without resorting to the expedient of fine grinding of the ore and to provide a process that is applicable to bauxite clays, kaolin and other aluminum oxide-containing materials in addition to the better grades of bauxite.

Heretofore the commercial production of aluminum sulfate has been carried out by digesting the ore with aqueous 50–60% sulfuric acid in a suitable reaction vessel. Digestion times of from 5 to 7 hours or longer have been common, particularly when low grade aluminum oxide-containing ores are used. Extraction efficiencies on the order of 85–90% of the $Al_2O_3$ in the ore are obtainable only when the ore is ground sufficiently fine to pass a 100 mesh screen. The resulting aluminum sulfate liquors therefore have a substantial content of very finely divided undissolved residue which poses a difficult settling and separation problem.

The present invention rests on two basic concepts. The first and most important of these is the discovery that the rate of reaction of aqueous sulfuric acid with aluminum oxide-containing ores such as bauxite can be materially accelerated by the presence of an excess of bauxite or other ore. The second is that the digestion time is still further shortened by grinding the sulfuric acid-aluminum oxide ore mixture during the digestion. By combining these features the time necessary to react substantially all of the sulfuric acid present with excess aluminum oxide-containing ore can be reduced to as little as 1–2 hours.

In its simplest embodiments the method of the invention would therefore consist in digesting bauxite or other ore with sulfuric acid in a ball mill or other grinding device. By this procedure the continuous attrition develops fresh surfaces of the ore for attack by the acid and thus accelerates both the speed and the completeness of the digestion reaction. Moreover, as will subsequently be shown in detail, continuous attrition during the reaction avoids the necessity of pulverizing the bauxite; instead, it can simply be crushed and screened to about 10–20 mesh size. Such bauxite, or even bauxite of larger average particle size, can be digested in a ball mill with substantially the same extraction efficiency as minus 100 mesh bauxite and in approximately the same length of time.

Maintenance of a substantial excess of bauxite or other aluminum oxide-containing ore over the amount theoretically necessary to combine with all of the sulfuric acid present will accelerate the digestion rate, but would entail substantial losses in $Al_2O_3$ values in the digestion residues. In accordance with a principal feature of the invention such losses are avoided by digesting these residues with additional sulfuric acid. Because of the small percentage of $Al_2O_3$ in the residues such a digestion would require many hours of reaction time if it were carried to the point of basicity, as is ordinarily required in bauxite digestion. However, I have found that the time can be materially shortened by employing excess sulfuric acid in this digestion. By reaction residues from the first digestion with excess sulfuric acid overall digestion efficiencies of as much as 95–98% of complete $Al_2O_3$ extraction are obtainable with total digestion times on the order of 3–4 hours.

When excess sulfuric acid is employed in the second digestion step the resulting aluminum sulfate liquors of course contain free sulfuric acid. In accordance with an additional feature of the invention these liquors are recycled to and mixed with the sulfuric acid-bauxite digestion mixture of the first digestion step. Since excess bauxite is carried in this step all of the residual sulfuric acid is utilized and the digestion product is an aluminum sulfate liquor containing little or no free sulfuric acid. This liquor is settled, preferably after treatment with an iron precipitant such as sodium sulfide and with a flocculating agent, the resulting clarified product being obtained as an aluminum sulfate suitable for further concentration and hardening to the solid aluminum sulfate of commerce.

The invention will be further described with reference to the accompanying drawing, the single FIGURE of which is a flow sheet illustrating a preferred embodiment of the process. On this drawing reference numeral 1 indicates diagrammatically a ball mill into which bauxite or other aluminum oxide-containing ore of suitable particle size is introduced from a storage bin or hopper 2. Added sulfuric acid is introduced through line 3 and an aqueous aluminum sulfate solution containing free sulfuric acid is recycled through line 4. The ball mill may be provided with any suitable heating and temperature regulating means, but is preferably jacketed for a suitable heating fluid such as steam or a liquid heat transfer medium. Ordinarily the contents of the ball mill are maintained in a boiling condition and the internal temperature is controlled by the boiling point of the reaction mixture.

The ball mill 1 preferably discharged through line 5 into a treating tank 6 provided with closed steam coils 7 for maintaining the contents in a suitably fluid condition and with an agitator 8. In this tank the effluent is treated with suitable quantities of a flocculant to assist in agglomerating and settling out solids and with an iron precipitant such as sodium sulfide. The contents of the tank are discharged through line 9 into a settling tank or thickener 10 provided with an overflow launder 11. In this tank the solid residue from the first-stage bauxite digestion is settled out as a sludge while the clarified liquor is decanted through line 12 to a filter 13. The filtrate passes through line 14 to a storage tank 15 or other receptacle for the finished aluminum sulfate solution. The filter cake solids may be either discarded or mixed with the settled solids from the thickener.

The sludge obtained as an underflow from the thickener 10 passes through line 16 to a reactor 17 where it reacts in a second digestion step with sulfuric acid introduced through line 18. Preferably a 5–20% excess of sulfuric acid over that necessary to combine with all of the aluminum oxide values in the solid residue is added, for reasons pointed out above. Reaction temperatures between about 215° and 230° F. are ordinarily maintained in this reactor, depending on the proportion of water present, and digestion times of about 1.5–2.5 hours may be used. The second stage digestion is preferably carried out continuously with continuous introduction of a stream of thickened sludge through line 16, the mixture being preferably stirred by means of an agitator 19 and the reaction product discharged through line 20. It will be understood, however, that the second stage digestion may be carried out as a batch operation if desired; in this case it may be desirable to add considerably more than a 20% excess of sulfuric acid. It is an advantage of the invention that any desired excess of acid may be used in the second stage since the digestion liquor from this stage is recycled back to the first digestion where its free sulfuric acid content is reacted with fresh bauxite.

The effluent in line 20 is a suspension of finely divided solid residues in an aluminum sulfate solution containing free sulfuric acid. This effluent is filtered on a filter 21 and the filter cake washed with water which is advantageously part or all of the water used to dilute the bauxite slurry in the ball mill 1 to its proper consistency. The washed filter cake or mud is discharged to waste while the filtrate passes through line 22 to a suitable holding tank, not shown, from which it is pumped into the ball mill 1 as needed.

It will be understood that other types of equipment and other treating steps may be employed within the scope of the invention in its broader aspects. Thus, although important advantages are obtained by grinding the bauxite-sulfuric acid mixture during the first digestion step, the advantages accruing from the presence of excess bauxite in the step are obtainable even when finely divided ore is used and grinding during the digestion is omitted. For this reason an agitated digestor may be substituted for the ball mill if desired. Similarly, the effluent from the first digestion step may be separated into liquid aluminum sulfate product and a solid aluminum oxide-containing residue by means other than the treating tank 6 or thickener 10 illustrated; for example, a suitable filter may be used. It will therefore be understood that in practicing the invention modifications and substitutions of equivalents may be resorted to within the scope of the appended claims.

The invention will be further described and illustrated by the following examples. These examples illustrate the reduction in processing time and the improved yields obtainable by conducting the digestion process in two separate steps, using excess bauxite in the first step and excess sulfuric acid in the second. Example 5 describes a complete cyclic process in detail and constitutes a full description of a specific embodiment.

*Example 1*

The results reported in this example were obtained in a jacketed laboratory ball mill with a diameter of about 9.5 inches and a depth of about 10 inches. A diphenyl-diphenyl oxide heating fluid was maintained at the desired temperature, usually within the range of 330°–380° F., by an electric heater and circulated through the jacket.

A first series of experiments was run to determine the effect of particle size of the bauxite on the speed and completion of the reaction. In all cases a 10% excess of bauxite was used; i.e., 499 grams of bauxite and 799 grams of 66° Bé. sulfuric acid diluted with 992 grams of water. Quantities of water varying from about 325 to 525 ml. were added during the runs to replace losses through evaporation. One run was made in which 499 grams of 4–6 mesh bauxite were added to 1500 grams of water at 212° F. in the ball mill as a control and ground 30 minutes.

Six classified bauxites ranging from 4–6 mesh to minus 100 mesh in size were digested, samples being withdrawn at regular intervals and analyzed. The starting temperature of each batch was 242° F., the boiling point of the acid-water mixture; after 30 minutes reaction it was usually between 220° and 225° F. The differences in reaction rates during the first 10–15 minutes were substantial, the coarser (4–10 mesh) grinds being slower, but there was much less difference during the second or 15–30 minute digestion period.

At the end of 30 minutes the completeness of reaction of the 4–6 mesh bauxite, the 6–10 mesh, the 10–20 mesh and the minus 100 mesh material all fell within plus or minus 10% of a mean of 90% completion when 10% excess bauxite was used. This increased to a 95% complete extraction in the next 30 minutes. It is seen, therefore, that by carrying out the sulfuric acid digestion in a ball mill or other comparable grinding equipment the necessity for fine grinding of the bauxite is avoided.

Tests were then made to find the optimum quantity of excess bauxite. In one series 2%, 6%, 10% and 15% excess bauxite was added and the acid concentration and initial reaction temperature were as described above. The reaction time was extended to 1.5 hours. It was found that the best overall results are obtained when from 6% to 15% excess bauxite is added. The test with a 10% excess of 4–6 mesh bauxite is typical; the log of this test is as follows:

Charge: 499 grams of bauxite, 796 grams of 66° Bé. sulfuric acid and 992 grams of water. During the run 1500 ml. of water were added to maintain constant volume.

| Time, Min. | Batch Temp., °F. | Oil Bath Temp., °F. | Sample Taken |
|---|---|---|---|
| 0  | 242 | 360 | ----- |
| 5  | 238 | 365 | ----- |
| 8  | 236 | 360 | ----- |
| 13 | 233 | 360 | ----- |
| 28 | 224 | 360 | No. 1 |
| 43 | 224 | 360 | No. 2 |
| 58 | 222 | 360 | No. 3 |
| 68 | 224 | 360 | No. 4 |
| 78 | 228 | 360 | No. 5 |
| 90 | 223 | 360 | No. 6 |

Sample analysis:

| Sample No. | Percent free $H_2SO_4$ | Percent dissolved $Al_2O_3$ | Percent completeness of reaction |
|---|---|---|---|
| 1 | 9.4 | 9.3  | 74 |
| 2 | 5.4 | 11.3 | 85 |
| 3 | 3.0 | 12.5 | 93 |
| 4 | 2.1 | 12.5 | 95 |
| 5 | 1.4 | 12.9 | 96 |
| 6 | 0.6 | 13.5 | 99 |

It was concluded from these and other similar tests that within the limits of from 1% to about 20% excess bauxite or other alumina-containing material the effect of a particular percentage increase on the percent completion of the digestion reaction is expressed roughly by the equation:

Percent increase in digestion = (percent excess bauxite)$^{0.7}$

*Example 2*

Using a different bauxite from that of Example 1 a combined experiment was performed. A first-stage digestion using 15.8% excess bauxite was carried out as described in Example 1 and 225°–230° F. for 2 hours and extracted with water. The filtered and washed residue from this stage was divided into 3 parts which were digested with 156%, 254% and 369% excess sulfuric acid over the theoretical required. After 2 hours at 215° F. the overall recoveries were 96.0%, 96.4% and 97.3% of the total $Al_2O_3$ in the bauxite. Four hour and six hour digestions with the 25% excess acid gave respective 98.1% and 98.8% overall $Al_2O_3$ extractions while when 369% excess acid was used the corresponding yields for 4 and 6 hour digestions were 98.3% and 98.9%. These figures indicate that an excess of about 2.5 times the theoretical amount of acid will produce about as good yields as will a larger quantity.

For purposes of comparison 108% of the theoretical bauxite was added to a 52.5% aqueous sulfuric acid solution. An addition period of 4.5 hours was required during which the temperature ranged between 252° F. and 236° F. An additional 4% over the theoretical bauxite was added during a 2¾ hour digestion period required to reach the desired basicity, during which the temperature was between 225° F. and 229° F. The result of this digestion during 7¼ hours using a total of 112% of bauxite was an $Al_2O_3$ extraction of 92.5% which is considerably lower than the recoveries from the two-stage digestion described above.

*Example 3*

A reactor was charged with 1045 grams of 93.7% sulfuric acid and 1271 grams of water and 684 grams of bauxite containing 59.65% $Al_2O_3$ was added, this being 120% of the theoretical amount. The mixture was boiled for 2 hours, diluted with 1165 grams more water, then sampled, filtered and the residue was washed with water.

In the second stage (part 1) the residue was slurried up with one-fourth the original quantity of water and 115% of the theoretical amount of sulfuric acid to dissolve the remaining $Al_2O_3$ was added. The mixture was digested at 215° F. for 3 hours and sampled. Then (part 2) an additional 15% of acid was added, making a total of 30% over theory on the original residue, and digestion at 215° F. was continued for three more hours. The cumulative extractions were:

|  | Percent of the $Al_2O_3$ extracted | | |
|---|---|---|---|
| Stage 1 | 84.4 | | |
|  | 1 hour | 2 hours | 3 hours |
| Stage 2: |  |  |  |
| Part 1 | 89 | 91 | 92 |
| Part 2 | 93 | 94 | 94 |

*Example 4*

A series of two-stage digestions was made in which varying quantities of excess bauxite were present in the first stage and varying quantities of excess acid in the second stage.

Preliminary experiments were first conducted to determine the times required to reach basicity; i.e., to react all of the sulfuric acid present when acid having an initial strength of 42.5% $H_2SO_4$ was used, with zero to 20% excess bauxite. These times were as follows:

| Excess bauxite | 0 | 5 | 10 | 15 | 20 |
|---|---|---|---|---|---|
| Time in minutes | 105 | 80 | 65 | 40 | 30 |

First stage digestions were then carried out with the same acid and bauxite for the times indicated and the solid residues were separated from the aluminum sulfate by filtration and washing and each was divided into four portions. These were digested separately for 2 hours with the same strength sulfuric acid. The total efficiency of each extraction was determined by measuring the quantity of aluminum sulfate produced. The results are shown in the following table.

| Excess Bauxite | Excess Acid | Percent Total $Al_2O_3$ Extracted |
|---|---|---|
| 5 | 5.3 | 92.7 |
| 5 | 10.5 | 97.2 |
| 5 | 14.6 | 99.3 |
| 5 | 22.0 | 99.5 |
| 10 | 5.1 | 92.3 |
| 10 | 10.5 | 96.8 |
| 10 | 14.2 | 97.8 |
| 10 | 21.0 | 98.2 |
| 15 | 5.14 | 93.4 |
| 15 | 8.22 | 95.1 |
| 15 | 12.75 | 96.4 |
| 15 | 21.0 | 97.9 |
| 20 | 5 | 93.2 |
| 20 | 10 | 95.7 |
| 20 | 15 | 97.4 |
| 20 | 20 | 98.2 |

It is seen that an almost complete extraction of the $Al_2O_3$ values of the bauxite is obtained in a considerably shorter time by maintaining excess bauxite in the first stage of the digestion and excess sulfuric acid in the second stage. Free acid in the aluminum sulfate solution from the second stage, resulting from the presence of excess acid in this stage, can be recovered by recirculating this solution back to the first stage of the digestion.

*Example 5*

On the basis of the foregoing results a continuous pilot plant process was designed for use with a commercial 10–20 mesh bauxite containing 59.65% $Al_2O_3$. A jacketed ball mill is charged continuously with the indicated quantities per hour of the following reagents:

29.5 lbs. of bauxite, a 20% excess
41 lbs. of 96% sulfuric acid
41 lbs. of water
26 lbs. of recirculated solution from the second stage containing 7.7% $H_2SO_4$, 35% $Al_2(SO_4)_3$ and the balance water With this mixture the digestion temperature in the mill is about 230°–235° F. and the retention time is preferably 40–60 minutes.

The reacted mixture is discharged continuously into a treating tank provided with closed steam coils where a flocculant such as polyacrylamide and an iron precipitant such as sodium sulfide are preferably added. It is then settled in a thickener from which the overflow is withdrawn as liquid aluminum sulfate product. The production rate is about 56–57 pounds of $Al_2(CO_4)_3$ per hour.

The underflow from the thickener is continuously digested with additional sulfuric acid in a second digestion step. The feed to this step is the following quantities per hour.

14.5 lbs. of residue solids from the first stage
12.5 lbs. of water
10 lbs. of 96% sulfuric acid, a 15% excess An agitated and steam jacketed reaction kettle is preferably used; a ball mill is unnecessary since the residue solids are finely divided. The reaction temperature is ordinarily about 215°–225° F. and digestion times of 1.5–2 hours are preferably employed. Under these conditions the overall extractions of $Al_2O_3$ are from about 95% to 98%. There is obtained as reaction product about 23 lbs. of an aqueous aluminum sulfate solution containing free sulfuric acid and having approximately the composition indicated above and about 12.6 lbs. per hour of mud containing less than 1% of $Al_2O_3$. These are separated on a filter. The filter cake is discharged to waste while the filtrate is returned to the first digestion step.

What I claim is:

1. A method for the production of aluminum sulfate which comprises digesting with sulfuric acid an excess of a bauxite ore over the amount theoretically necessary to combine with all of the sulfuric acid present, separating the solid residue from the resulting aluminum sulfate, mixing said residue with an excess of additional sulfuric acid over that necessary to combine with all of its remaining aluminum oxide content and digesting the resulting mixture at 215°–230° F.

2. A method for the production of aluminum sulfate which comprises digesting with sulfuric acid a 5% to 20% excess of a bauxite ore over the amount theoretically necessary to combine with all of the sulfuric acid present, separating the solid residue from the resulting aluminum sulfate, mixing said residue with an excess of additional sulfuric acid over that necessary to combine with all of its remaining aluminum oxide content and digesting the resulting mixture at 215°–230° F.

References Cited in the file of this patent

UNITED STATES PATENTS

| 209,488 | Lewis | Oct. 29, 1878 |
| 1,964,382 | Fleischer | June 26, 1934 |
| 2,958,580 | Loevenstein | Nov. 1, 1960 |